United States Patent [19]

Parylak

[11] Patent Number: 4,657,200
[45] Date of Patent: Apr. 14, 1987

[54] ALIGNMENT DEVICE FOR FISHING REEL GEARS

[75] Inventor: Stanley R. Parylak, Sewell, N.J.

[73] Assignee: Penn Fishing Tackle Mfg. Co., Philadelphia, Pa.

[21] Appl. No.: 757,843

[22] Filed: Jul. 22, 1985

[51] Int. Cl.⁴ .......................................... A01K 89/015
[52] U.S. Cl. .............................. 242/84.1 R; 74/339; 74/395
[58] Field of Search .................. 242/84.1 R, 215; 74/339, 395, 400, 665 N; 254/342, 345

[56] References Cited

U.S. PATENT DOCUMENTS

| 1,971,724 | 8/1934 | Mathieu | 242/215 |
| 3,215,360 | 11/1965 | Chambers | 242/215 |
| 4,390,147 | 6/1983 | Buckerman | 242/215 |

Primary Examiner—Billy S. Taylor
Attorney, Agent, or Firm—Benasutti and Murray

[57] ABSTRACT

An improvement in a fishing reel having a first plurality of gears concentrically disposed on a rotatable shaft wherein respective teeth of said gears can intermesh between respective teeth of any of a second plurality of gears, with said pluralities shiftable and ratioed between each other for speed and power action on a fishing line. The improvement comprises a gear alignment adjustment means comprising a limitedly rotatable disc selectively so rotatable and fixable at any position so rotated. This disc is in slidable communication with a drive plate fixedly engaged with the rotatable shaft and having a plurality of stop means which permit continuous drive plate rotation in one direction only. Reverse rotation of the drive plate engages the stop means at sites which approximate intermeshing of the gear pluralities. Slight rotation of the disc accomplishes precise intermeshing which is maintained when said so-rotated disc is fixed in the so-rotated position.

6 Claims, 4 Drawing Figures

ALIGNMENT DEVICE FOR FISHING REEL GEARS

BACKGROUND OF THE INVENTION

This invention relates to a gear adjustment means for fishing reel gears, said adjustment means being operable to adjust alignment of a first plurality of gears with an intermeshable second plurality of gears, and being retainable in position upon accomplishment of such alignment.

The importance of versatility in the operational qualities of a fishing reel is well recognized by both the professional and the amateur fisherman. Such versatility is especially important in permitting an operator to variably select the velocity of fishing line release and recall as well as the power transmitted to the line during recall when a fish is on said line. One manner of providing such versatility is disclosed in copending and commonly assigned U.S. patent application Ser. No. 589,889, filed Mar. 15, 1984, and entitled "Drive Mechanism For Fishing Reel" and now U.S. Pat. No. 4,560,118. Specifically, the copending application concerns a fishing reel having integral therewith a plurality of gears which effect performance characteristics of the spool shaft and resultant line behavior. Furthermore, the gears are easily shiftable when in compatible alignment, thereby providing rapid response for an operator employing said reel.

The achievement of compatible alignment and its maintenance during reel use is essential for operability. As in a reel manufactured according to the above-referenced, copending application, such reel has a plurality of fixed gears of varying sizes which must intermesh with a plurality of transversely movable gears in order to effectuate gear shifting and resultant gear ratio variations. As is evident to the skilled artisan, multiple intermeshing of variably-sized and arranged gears manufactured and mounted individually requires extreme precision during assembly of the entire workpiece since such multiple intermeshing can only occur at few relative positions. Likewise, after successful assembly occurs, normal wear during use can result in some magnitude of mis-alignment. Presently, the initial assembly procedure of such reels essentially is a trial-and-error, time-consuming task wherein fine adjustments of the gears are repeated a number of times until precise gear intermeshing occurs. Likewise, worn assemblies are either adjusted by the same time-consuming trial-and-error approach, or the entire assembly is discarded and replaced with an already-aligned assembly. The above-referenced copending application provides stop means which approximate sites of gear intermeshing. However, it is evident that a need is present for a fishing reel which possesses means to effectuate fast and precise gear alignment both during assembly and after use.

SUMMARY OF THE INVENTION

It is therefore a primary object of this invention to provide a gear alignment adjustment means to a geared fishing reel.

It is a further object of the invention to provide a gear alignment adjustment means which is easily accessible and can effectuate adjustment rapidly.

Yet another object of the invention is to provide a gear alignment adjustment means having utility during assembly of a fishing reel as well as after use thereof resulting in worn and misaligned gears.

These and other objects will become apparent throughout the specification. Accordingly, the subject of the instant invention is an improvement in a fishing reel having a first plurality of gears concentrically disposed on a rotatable shaft wherein respective teeth of said gears selectively can intermesh between respective teeth of any of a second plurality of rotatable gears adjacent thereto and in communication with exteriorly activated rotation means. These first and second pluralities of gears are shiftable and ratioed between each other for selectable variable speed and power which is transmitted to a fishing line of said reel. The improvement comprises a gear alignment adjustment means which comprises, first of all, a limitedly rotatable disc selectively so rotatable and fixable at any position so rotated. The disc has at least one laterally protruding member, urged under tension to so protrude, and is annularly rotatable a distance at least equivalent to the greatest distance between the intermeshable gear teeth of the reel. The adjustment means further comprises a drive plate fixedly engaged with the rotatable shaft, and in adjacent slidable communication with the disc. The drive plate has a plurality of stop means which permits continuous drive plate rotation in one direction only. The stop means are geometrically complimentary to the laterally protruding member of the disc for engagement therewith, and are disposed to prevent reverse direction of the drive plate at sites where gear intermeshing can occur. Because the limitedly rotatable disc is rotatable annularly a distance at least equivalent to the greatest distance between intermeshing gear teeth, the first plurality of gears can be limitedly and controllably rotated a distance sufficient to permit gear teeth of said first plurality to precisely intermesh with gear teeth presented by the second plurality. This adjustment means therefore finds utility in both the initial assembly of the entire reel as well as the re-alignment of gears as required because of wear on the gears caused by use of the reel.

DETAILED DESCRIPTION OF A PREFERRED EMBODIMENT

Figure 1:
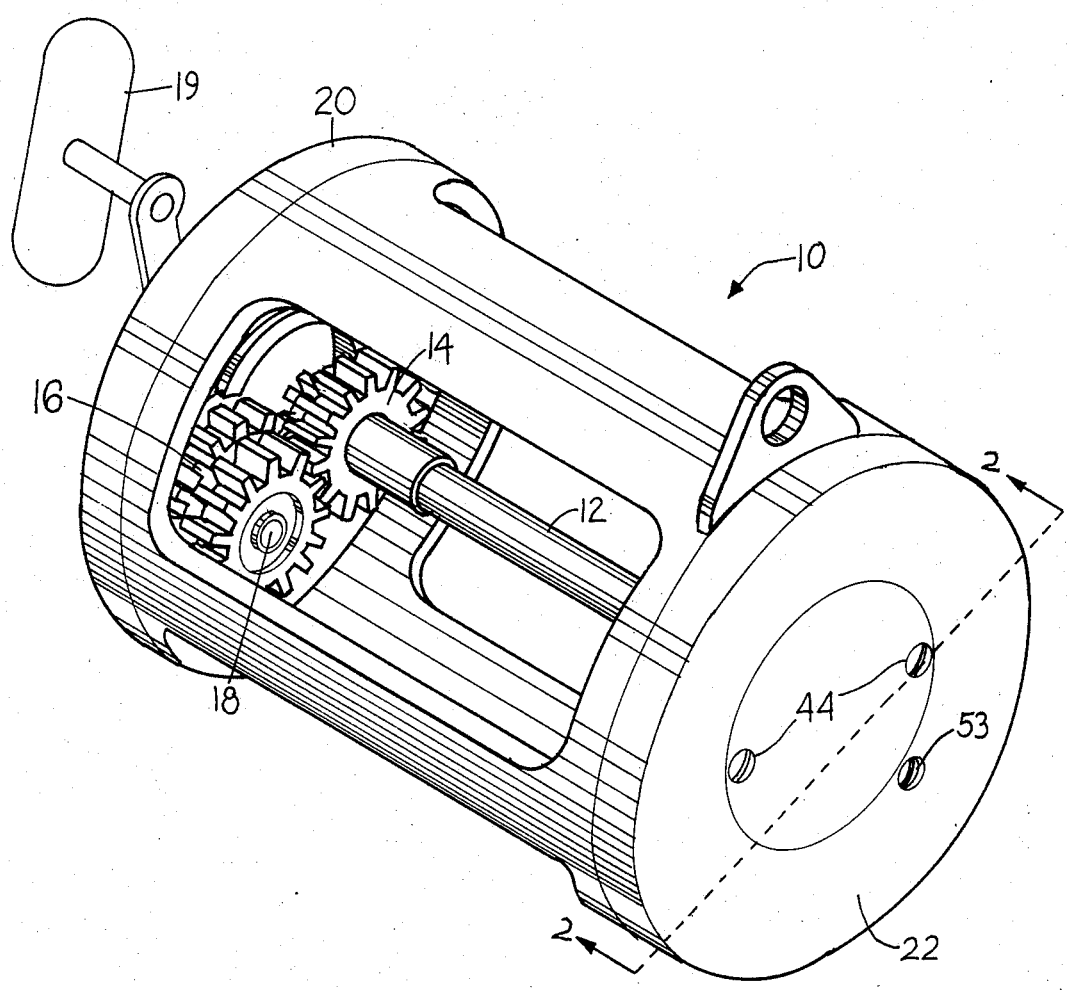
FIG. 1 is a perspective view of a fishing reel having intermeshing gears.

Referring to FIG. 1, a fishing reel 10 having a rotatable central spool shaft 12 is shown. Disposed on the spool shaft 12 is a plurality of gears 14 whose respective teeth mesh between respective teeth of a second plurality of gears 16 which rotate via a stub shaft 18 in communication with an external handle 19. The reel 10 has two opposed side plates 20, 22 in which the spool shaft 12 is journaled at each end thereof in respective boss-housed bearings as known in the art.

Figure 2:
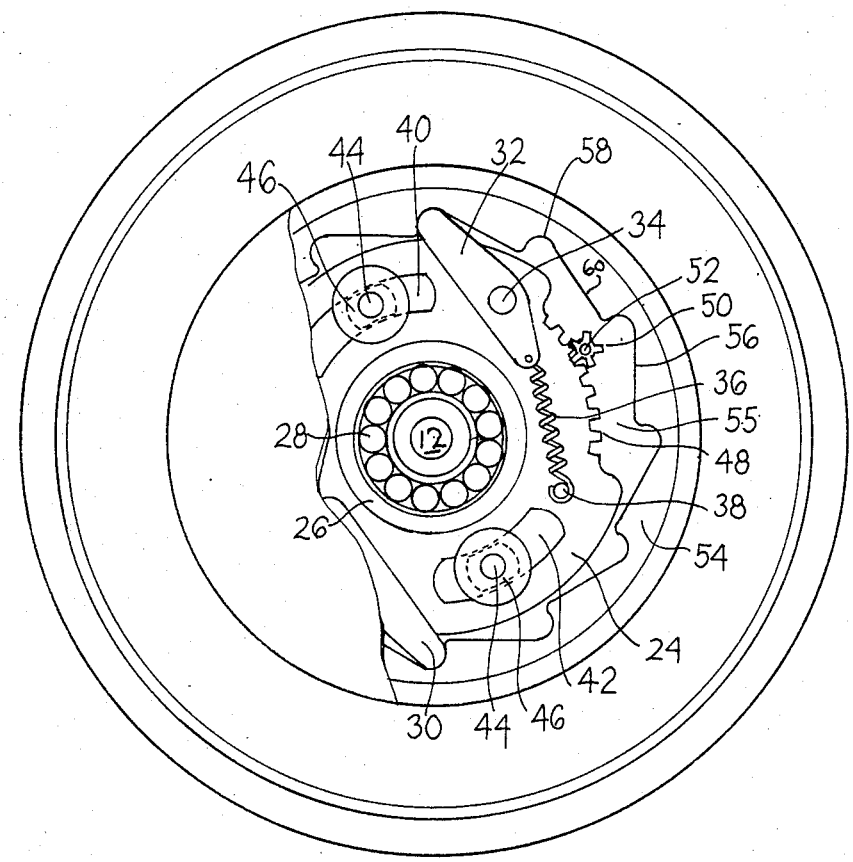
FIG. 2 is an elevational view partially in section along line 2—2 of FIG. 1.

Referring to FIG. 2, an elevational view along line 2—2 of FIG. 1 at 90° counterclockwise therefrom, a preferred gear alignment adjustment means is shown. Specifically, a disc 24 surrounds the boss housing 26 of the bearing 28. One end of the spool shaft 12 is housed centrally therein as known in the art. The disc 24 has pivotally mounted thereon two laterally protruding members or dogs 30, 32 which rotate on respective pins 34, one of said pins shown on dog 32. The dogs 30, 32 are retained in a tensioned mode by respective springs 36, one of said springs shown on dog 32, each connected at one end to the dogs 30, 32 and at the other end to two respective pins 38 projecting upwardly from the disc 24. The disc 24 is provided with two annular openings 40, 42 disposed 180° from each other and 90° from each dog 30, 32. Respective screws 44 pass through the side plate 22 and through the openings 40, 42 to be retained in place with respective lock nuts 46. Along a portion of the periphery of the disc 24, teeth 48 are provided which mesh with teeth of a pinion gear 50 mounted on a shaft 52 accessible exteriorly through the side plate 22. As shown in FIG. 1, the shaft 52 is provided with a slot 53 in which the head of a screwdriver will fit. Alternatively, as shown in FIG. 4, instead of providing said teeth 48, pinion gear 50 and shaft 52, a disc itself can be provided with a stem handle 68 which projects through an arcuate opening 70 in the side plate 22. In such an embodiment, all other elements of said disc itself as well as those of the reel itself are identical to those described for the embodiments of FIGS. 1-3.

Figure 3:
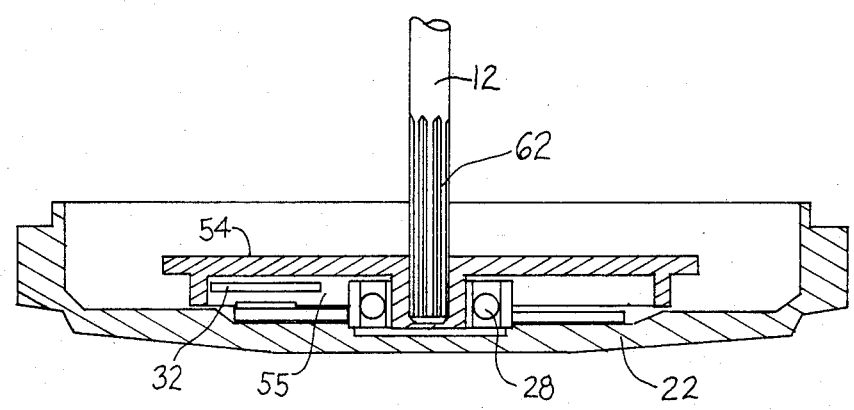
FIG. 3 is a side elevational view in section of FIG. 2.
Figure 4:
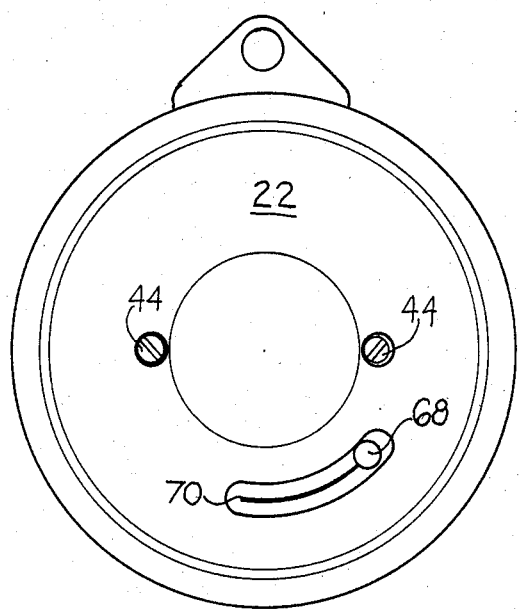
FIG. 4 is an end elevational view of a second embodiment of a fishing reel.

A drive plate 54 shown in FIGS. 2 and 3 comprise said plate having a central compartment 55 which has a circumferential rim 56 whose inner wall has a face configuration comprising a plurality of angularly inwardly projecting ramps 60 terminating in repective shoulders 58. The spool shaft 12 passes centrally through the plate 54 and is engaged with said plate 54 via spline 62. In such manner, of couse, the plate 54 and spool shaft 12 rotate together. As is evident in FIG. 2, the dogs 30, 32 are maintained to ride along the interior of the rim 56 within the shoulders 58 and ramps 60 as the plate 54 rotates. The plate 54 can rotate in one direction only since the shoulders 58 are shaped to prevent bi-directional rotation.

As earlier related, the first plurality of variably-sized gears 14 disposed on the spool shaft 12 must mesh with the second plurality of variably-sized gears 16. To accomplish such meshing, precision placement of gear teeth is required, and the maintenance of such placement must be achieved. During intitial assembly of the reel 10, an assembler aligns the gear teeth by sight in combination with use of the shoulders 58. Specifically, said shoulders 58 are positioned to stop reverse rotation of the plate 54 at sites where all gear teeth are approximately intermeshable. Subsequently, the assembler can limitedly rotate the disc to achieve precise intermeshing of the respective gear teeth. Once this is accomplished, the screws 44 are tightened and the gear placement is thereby secured.

After a period of time during which the reel 10 is used, the gear teeth experience wear which can interfere with smooth intermeshing and gear shifting because of resulting slight misalignment. When this condition occurs, a user merely loosens the screws 44 which then allows the disc to limitedly rotate. The user then rotates the shaft 52 to so rotate the disc a sufficient distance to again precisely align the gear teeth. Screws 44 are then tightened to secure gear placement. In this manner the intermesh of the gears can be maintained and a lengthy utility of the reel 10 is assured.

It is to be understood that the above description of a preferred embodiment is illustrative and not meant to be limiting, and that the scope of the invention is defined by the claims which follow.

What is claimed is:

1. In a fishing reel having a first plurality of gears concentrically disposed on a rotatable shaft wherein respective teeth of said gears selectively can intermesh between respective teeth of any of a second plurality of rotatable gears adjacent thereto and in communication with exteriorly activated rotation means, with said first and second pluralities of gears shiftable and ratioed between each other for selectable variable speed and power transmittable to a fishing line of said reel, wherein the improvement comprises:
  (a) a disc comprising exteriorly accessible rotation means to selectively rotate said disc an annular distance and having rotation securement means to selectively fix the disc at any position of rotation, with said disc additionally comprising at least one pivotally-mounted member having tensioning means to urge said member to protrude laterally from the perimeter of the disc; and
  (b) a drive plate fixedly engaged with the rotatable shaft, said drive plate being in adjacent slidable communication with the disc and having a plurality of stop means which permit continuous rotation of said drive plate in one direction only, said stop means being geometrically complimentary to the laterally protruding member of said disc for engagement therewith and disposed to prevent reverse direction of said drive plate at sites where gear intermeshing can substantially occur.

2. A fishing reel as claimed in claim 1 wherein the disc has two pivotally-mounted members disposed essentially 180° from each other, and wherein the drive plate has a central compartment wherein the disc resides, said central compartment having said stop means comprising an inner wall whose face configuration comprises a plurality of angularly inwardly projecting ramps terminating in respective shoulders, with said pivotally-mounted members of the disc being maintained under tension in contact with the inner wall and permitting continuous rotation of the drive plate in one direction only, and with said shoulders disposed to prevent reverse direction of said drive plate at positions where gear intermeshing can substantially occur.

3. A fishing reel as claimed in claim 1 or 2 wherein the rotation securement means comprises a plurality of arcuate openings through which respective exteriorly accessible securement members pass for releasable securement therein.

4. A fishing reel as claimed in claim 2 wherein the disc has therethrough two arcuate openings each essentially 90° from each pivotally-mounted member and through which openings respective exteriorly accessible securement members pass for releasable securement therein.

5. A fishing reel as claimed in claim 1 or 2 wherein the disc has along a portion of the periphery thereof teeth, and wherein the exteriorly accessible rotation means comprises an exteriorly accessible rotatable shaft having pinion teeth which mesh with the teeth of said disc to effectuate selective rotation of said disc.

6. A fishing reel as claimed in claim 1 or 2 wherein the exteriorly accessible rotation means comprises an exteriorly accessible handle projecting from the disc to effectuate selective rotation of said disc.

* * * * *